US012769596B2

(12) United States Patent
Barnes et al.

(10) Patent No.: US 12,769,596 B2
(45) Date of Patent: Oct. 20, 2026

(54) MESSAGE SERIALIZATION AND DESERIALIZATION WITH DYNAMICALLY CONFIGURED SUBMESSAGES USING STRUCTURED SCHEMA

(71) Applicant: Dell Products L.P., Round Rock, TX (US)

(72) Inventors: Michael Barnes, Doylestown, PA (US); Ashutosh P. Nanekar, Cary, NC (US); Dominique Prunier, Montreal (CA); Daniel A. Lottero, Milford, MA (US); Kshitij Patel, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 415 days.

(21) Appl. No.: 18/142,798

(22) Filed: May 3, 2023

(65) Prior Publication Data

US 2024/0370323 A1 Nov. 7, 2024

(51) Int. Cl.
*G06F 9/54* (2006.01)
*G06F 16/21* (2019.01)

(52) U.S. Cl.
CPC .............. *G06F 9/546* (2013.01); *G06F 9/542* (2013.01); *G06F 16/212* (2019.01)

(58) Field of Classification Search
None
See application file for complete search history.

(56) References Cited

U.S. PATENT DOCUMENTS

| | | | | |
|---|---|---|---|---|
| 6,928,488 | B1 * | 8/2005 | de Jong | G06F 9/4493 709/246 |
| 2003/0191803 | A1 * | 10/2003 | Chinnici | G06F 9/547 709/203 |
| 2004/0244012 | A1 * | 12/2004 | Massarenti | G06F 9/4493 719/319 |
| 2006/0190469 | A1 * | 8/2006 | Kathuria | G06F 9/4493 |
| 2007/0180043 | A1 * | 8/2007 | Vernal | H04L 69/165 709/208 |
| 2012/0246653 | A1 * | 9/2012 | Boruhovski | G06F 9/541 718/102 |
| 2017/0131980 | A1 * | 5/2017 | Velandy | H04L 69/24 |
| 2018/0332367 | A1 * | 11/2018 | Kaitchuck | H04L 67/568 |

(Continued)

*Primary Examiner* — Charles E Anya

(74) *Attorney, Agent, or Firm* — Terrile, Cannatti & Chambers, LLP; Emmanuel A. Rivera

(57) ABSTRACT

A system, method, and computer-readable medium for encoded byte message serialization and deserialization by microservices. A comprising receiving a multi-level message is received that includes generic data types for serialization and deserialization the encoded byte message. The multi-level message includes a top level message as to type that provides general information about content and applicability, and sub-messages as to types that include content related to purpose which includes an undefined type that contains properties related to schema for serialization and deserialization of the encoded byte message. The top level message and sub-messages content are processed to determine the undefined type that contains properties related to schema for serialization and deserialization of the encoded byte message. Dynamic loading is performed as to schema properties of the undefined type for serialization and deserialization of the encoded byte message for consumption by the microservices.

20 Claims, 8 Drawing Sheets

(56) References Cited

U.S. PATENT DOCUMENTS

| | | | | |
|---|---|---|---|---|
| 2019/0042290 | A1* | 2/2019 | Bailey | G06F 8/31 |
| 2020/0028946 | A1* | 1/2020 | Vora | H04L 1/1874 |
| 2021/0349743 | A1* | 11/2021 | Panchomarthi | H04L 9/0819 |
| 2022/0114270 | A1* | 4/2022 | Wang | G06F 9/5027 |
| 2022/0311835 | A1* | 9/2022 | Aluvila | H04L 67/51 |
| 2024/0272969 | A1* | 8/2024 | Crouse | H04L 51/212 |

* cited by examiner

300

302

```
message CIQMessage {
  string messageId = 1;                // uuid message identifier
  int64 messageTimeMs = 2;             // message generation time
  int64 collectionTimeMs = 3;          // epoch millis (per source's system clock) when data was collected
  string correlationId = 4;            // source identifier(s) contributing data to this message, for traceability
  int32 generation = 5;                // the number of transformations (i.e. 1st gen, 2nd gen) performed to create the message's
  string product = 6;                  // like "product" in traditional GDS, but can also represent domains like "Install Base" object
  string systemId = 7;                 // fully qualified system identifier suitable for direct use in GDS

  oneof messageInfo {

    AlertInfo         alertInfo = 20;
    AlertDeleteInfo   alertDeleteInfo = 21;
    AlertSyncInfo     alertSyncInfo = 22;
    AlertCompleteInfo alertCompleteInfo = 23;

    EventInfo         eventInfo = 30;
    EventCompleteInfo eventCompleteInfo = 31;

    MetricInfo         metricInfo = 40;
    MetricCompleteInfo metricCompleteInfo = 41;

    ObjectInfo         objectInfo = 50;
    ObjectDeleteInfo   objectDeleteInfo = 51;
    ObjectSyncInfo     objectSyncInfo = 52;
    ObjectCompleteInfo objectCompleteInfo = 53;

    ObjectCreateEventInfo objectCreateEventInfo = 54;
    ObjectModifyEventInfo objectModifyEventInfo = 55;
    ObjectDeleteEventInfo objectDeleteEventInfo = 56;

    RelationshipInfo         relationshipInfo = 60;
    RelationshipDeleteInfo   relationshipDeleteInfo = 61;
    RelationshipSyncInfo     relationshipSyncInfo = 62;
    RelationshipCompleteInfo relationshipCompleteInfo = 63;

    SystemInfo                systemInfo = 70;
    SystemInfoModifyEventInfo systemInfoModifyEventInfo = 71;

    CompleteInfo completeInfo = 99; // for backward compatibility
  }
}
```

306

304

*Figure 3*

400

Two examples of schema that work with
MetricInfo submessage "google.protobuf.Any properties"

```
message MetricInfo {
  string objectType = 1;
  MetricKind kind = 2;
  string dataType = 3;
  string dataSubType = 4;
  MetricInterval interval = 5;
  string objectId = 6;
  string schemaVersion = 7;
  google.protobuf.Any properties = 8;
}
```

402

*Figure 4*

500

502

Message One is looked with key =
POWERSTORE__APPLIANCE__COUNTER__PERFORMANCE__SELF__1.9

```
message PowerstoreMetricApplianceCounterPerformanceSelf_1_9 {
    CIQInt64 cpuBusyTime = 1;
    CIQInt64 cpuTotalTime = 2;
    CIQInt64 readCount = 3;
    CIQInt64 readBytes = 4;
    CIQInt64 readTime = 5;
    CIQInt64 writeCount = 6;
    CIQInt64 writeBytes = 7;
    CIQInt64 writeTime = 8;
    CIQInt64 uptime = 9;
}
```

504

Message Two is looked with key =
ISILON__STORAGE_POOL_TOTAL__FACT__CAPACITY__SELF__1.5

```
message IsilonMetricStoragePoolTotalFactCapacitySelf_1_5 {
    CIQInt64 notAvailableHDDCapacityInBytes = 1;
    CIQInt64 used_hdd_bytes = 2;
    CIQInt64 availableHDDCapacityInBytes = 3;
    CIQInt64 notAvailableCapacityInBytes = 4;
    CIQInt64 unprovisioned_free_bytes = 5;
    CIQInt64 used_bytes = 6;
    CIQInt64 unprovisioned_used_bytes = 7;
    CIQInt64 provisioned_used_bytes = 8;
    CIQInt64 unprovisioned_bytes = 9;
    CIQInt64 virtual_hot_spare_bytes = 10;
    CIQInt64 provisioned_free_bytes = 11;
    CIQInt64 availableCapacityInBytes = 12;
    CIQInt64 total_hdd_bytes = 13;
    CIQFloat used_percentage = 14;
    CIQInt64 total_bytes = 15;
    CIQInt64 used_ssd_bytes = 16;
    CIQInt64 total_ssd_bytes = 17;
    CIQInt64 free_bytes = 18;
    CIQInt64 provisioned_bytes = 19;
}
```

*Figure 5*

600

The schema key for the above metric message two is defined

| | |
|---|---|
| Product = ISILON | -- from top level message |
| ObjectType = STORAGE_POOL_TOTAL | -- from MetricInfo |
| DataType = FACT | -- from MetricInfo |
| DataSubType = CAPACITY | -- from MetricInfo |
| Kind = SELF | -- from MetricInfo |
| SchemaVersion = 1.5 | -- from MetricInfo |

all of these fields are joined by a double underscore "__"

*Figure 6*

MESSAGE SERIALIZATION AND DESERIALIZATION WITH DYNAMICALLY CONFIGURED SUBMESSAGES USING STRUCTURED SCHEMA

BACKGROUND OF THE INVENTION

Field of the Invention

The present invention relates to product support services. More specifically, embodiments of the invention provide a system, method, and computer-readable medium for data (message) serialization and deserialization with dynamically configured submessages as to schema for the data.

Description of the Related Art

Products, such as computer hardware (e.g., laptop computers, network servers, data storage, power supplies, etc.), can be implemented to send telemetry data/information as messages. The messages can be received by a service that processes the messages to make determination as to health and status of the products.

The service can use message brokers (e.g., Kafka and RabbitMQ) which can create load and storage problems at enterprise scale due to their large message size. Reducing message size through byte serialization can effectively reduce message size by up to 50%.

Such byte serialized message or data processing are compiled/configured as applications and necessitate the need to rebuilding and redeploying the applications to make schema changes, add new schemas and provide for the new/processed message capability. Schema for serialization/deserialization is often written/defined by people who do not write the code for the microservice that uses the schema. If recompilation and redeployment is required each time is updated, added or deleted from an underlying schema repository, the application would not scale well understand high load enterprise applications.

SUMMARY OF THE INVENTION

A computer-implementable method, system and computer-readable storage medium for encoded byte message serialization and deserialization by microservices comprising receiving a multi-level message with generic data types for serializing and deserializing the encoded byte message, wherein the multi-level message includes a top level message as to type that provides general information about content and applicability, and sub-messages as to types that include content related to purpose which includes an undefined type that contains properties related to schema for serialization and deserialization of the encoded byte message; processing the top level and sub-messages content to determine the undefined type that contains properties related to schema for serialization and deserialization of the encoded byte message; and dynamically loading the schema properties of the undefined type for serialization and deserialization of the encoded byte message for consumption by the microservices.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 is a master or multilevel multi-level message with generic data types for serialization and deserialization of encoded byte messages;

FIG. 4 is a sub-message with data types including defined and undefined types;

FIG. 5 are messages referenced or embedded by an undefined type;

FIG. 6 is a key used to look up sub-messages;

DETAILED DESCRIPTION

Implementations provide for the on-the-fly schema loading into sub-message types representing product service data that allows strict schema enforcement with capability to add/update schema with affecting performance/requiring redeployment.

A messaging scheme, such as the use of Google Protocol Buffers or Google Protobuf format is implemented with a message (e.g., Kafka) broker. The scheme implements a multi-level message, that can be formatted as Google Protobuf message. The multi-level message includes embedded sub-messages used to facilitate data-flow control or transfer of data (e.g., Kafka messages). The sub-messages used for encoded byte messages (e.g., Kafka message) transfer can have an additional subtype message with dynamically loaded schema. The dynamically loaded schema for serialization and deserialization for sending/receiving encoded byte messages (e.g., Kafka messages) to message (e.g., Kafka) brokers or microservices. The microservices can be written in are written in Python, Java, C#.NET, Golang, Scala, or C++.

Implementations provide for message (e.g., Kafka) brokers/microservices to request information as to schema properties as to serializing/deserializing and can call (e.g., REST call) to a schema proto manager. The schema proto manager reads schema information (e.g., meta data) from a schema database. This allows schema validation to be enabled and enforced in a dynamic manner. Adding new schema can be implemented by creating a schema declaration (e.g., JSON based) and adding such to the schema database. Therefore, schema can be loaded to the schema database and used for serializing/deserializing encoded byte messages (e.g., Kafka messages).

The master or multilevel multi-level message, formatted as Google Protobuf message includes a top level message with system information, embedded subtype messages representing broad classes of message types (e.g., metrics, relationships, alerts, etc.) for generic data streaming. A second level embedded message within an embedded subtype messages defined by the schema proto manager to be compiled/built into protocol buffers. The second level embedded message is provided dynamically, avoiding the need to compile.

Figure 1:
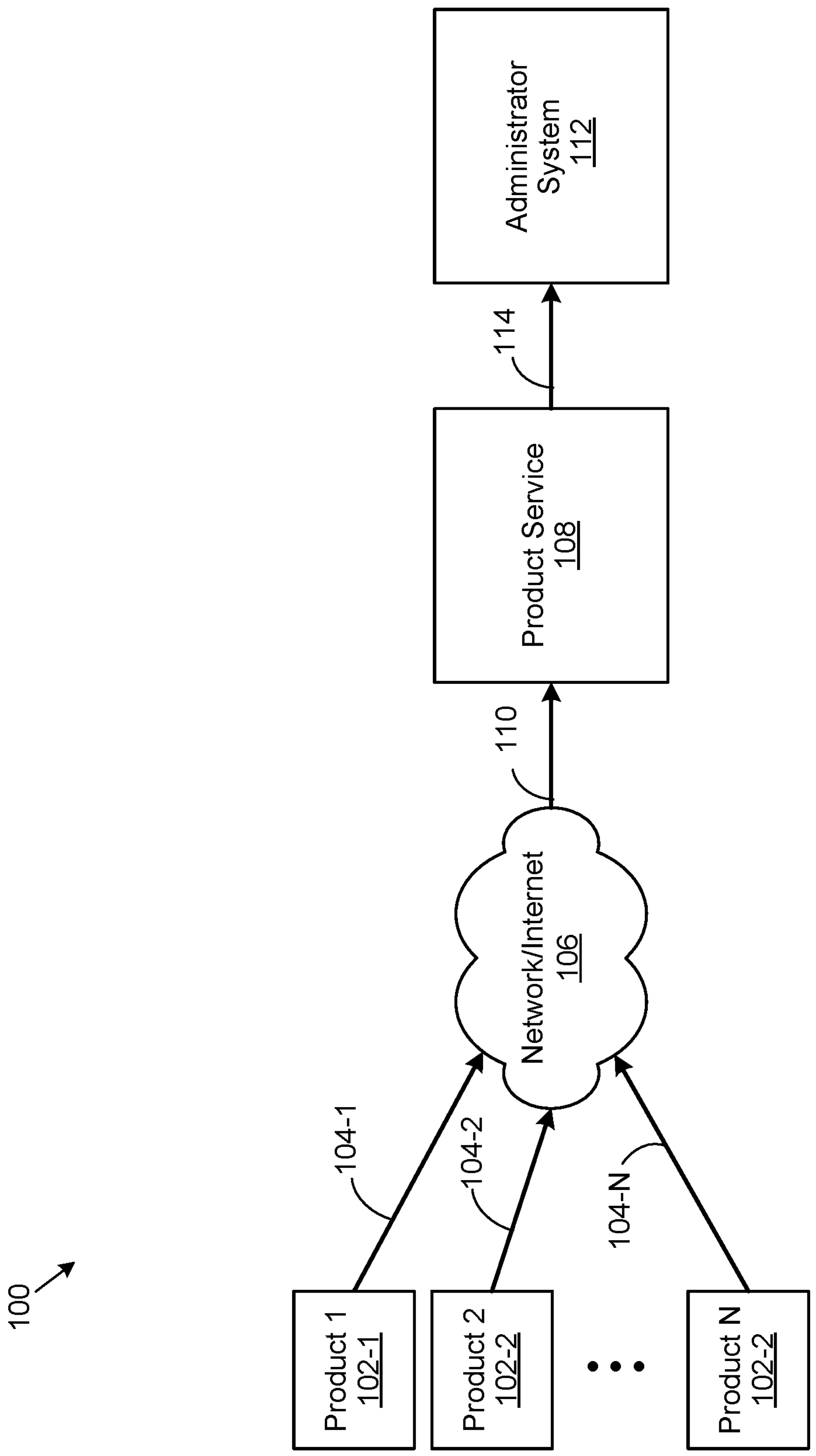
FIG. 1 is a general illustration of a system for data serialization and deserialization with dynamically configured submessages.

FIG. 1 is a general illustration of a system 100 for processing in order data/information received as messages. The system 100 includes multiple products 102-1 to 102-N. Products 102 can include computer hardware (e.g., laptop computers, network servers, data storage, power supplies, etc.). Implementations provide for products 102 to be configured to send their respective telemetry data 104. Telemetry data 104 can be sent out over a specific period of time (e.g., every hour), and can include data/information in the form of message files. Message files can be specific to volumes, pools, etc. related to particular products 102. Data/information in the message files can include I/O processed, disk storage, memory storage, etc. of products 104. In certain implementations a payload file includes the message files.

System 100 includes network 106. Network 106 can include one or more wired and wireless networks, including the Internet. The telemetry data 104 is sent through the network 106. A product service 108 receives telemetry data 104 in the form of payload files 110. Product service 108 can be implemented as a cloud computing service, as one or more information handling systems (e.g., one or more servers), etc.

The product service 108 processes messages/payload files 110 to make determination as to health and status of the products 102. The product service 108, as further described herein, is configured to process payload files 110. In particular, payload files 110 can be relatively large files (e.g., greater than 1 GB), and are parsed out for further processing by product service 108.

The system 100 can include an administrator system 112. Implementations provide for the administrator system 112 to be included in product service 108. The administrator system 112 is configured to receive data/information 114 from the product service 108. In particular, as further described herein, data/information 114 can include product 104 information as gathered by product service 108, and specific change event information as to the products 104.

Figure 2:
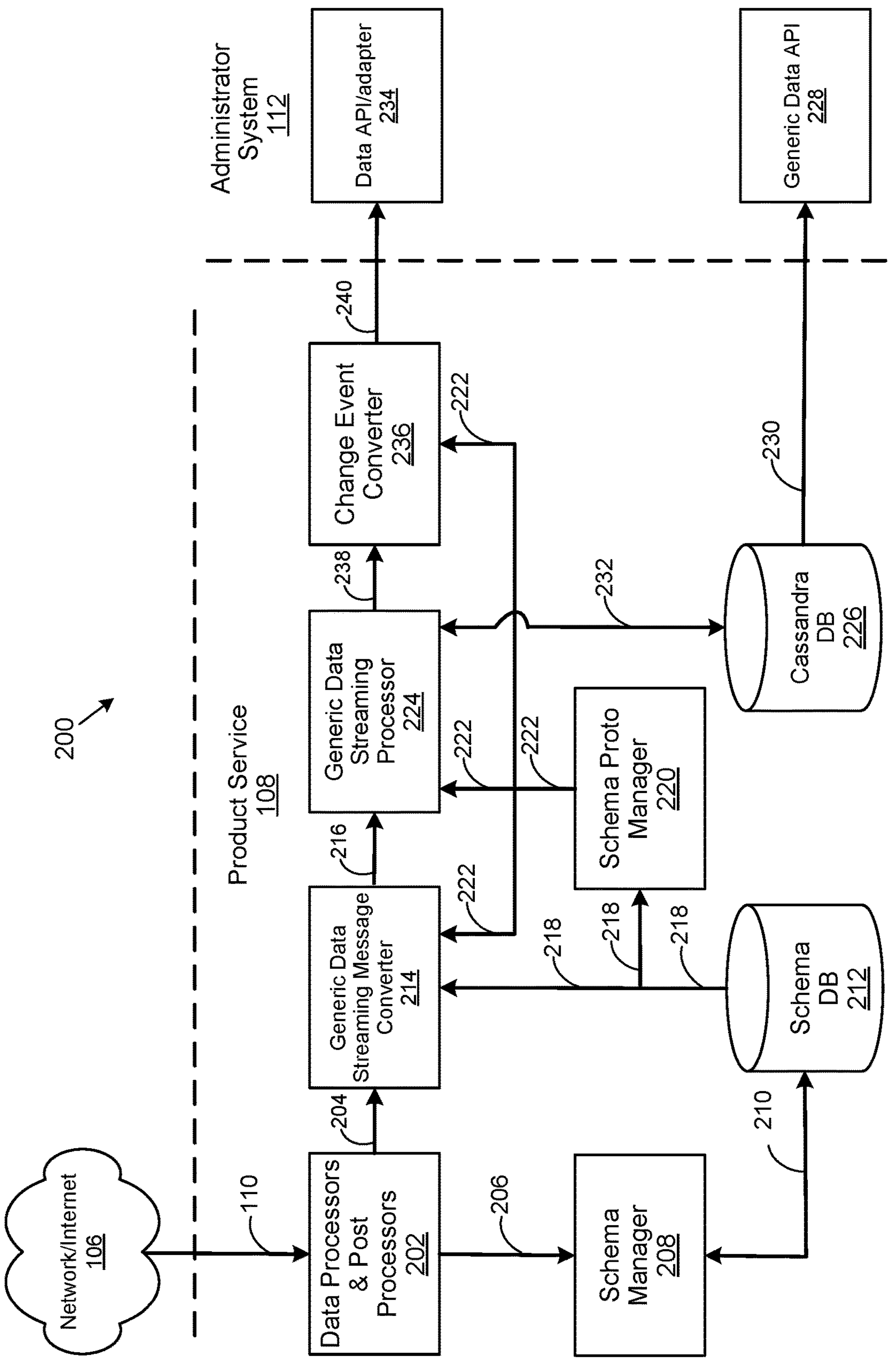
FIG. 2 is a general illustration of product service system for data serialization and deserialization with dynamically configured submessages.

FIG. 2 is a general illustration of a system 200 for product service 108 for processing large and small files for in order message processing with reactive micro-services. The elements of system 200 can be implemented as components, applications, microservices, etc.

Implementations provide for reactive stream processing of large message groups with special coding precautions, such as use of concatMap which preserves the order of items/messages, rather than the more typical flatMap, to ensure messages are produced or sent to a message broker (e.g., Kafka) broker in order as appropriate. Special sync and complete messages are created to indicate the completion of in-order message processing group, where every message in a group utilizes the same key (e.g., Kafka) coded to a systemId and objectType specific to product service 108.

Implementations provide for product service 108 to include data processors and post processors 202 that receive payload files 108. Data processors and post processors 202 can be configured to receive large (e.g., greater than 1 GB) payload files 108 which are based on certain file based protocols. The data processors and post processors 202 read, process, and parse the payload files 108.

In particular, data processors and post processors 202 transform the data/information, or act as a message broker. For example, RabbitMQ message brokering can be implemented, and data processors and post processors 202 send RabbitMQ/advanced message queuing protocol (AMQP) messages 204. In addition, data processors and post processors 200 can process and post schema information 206 as to products 104, such as volumes, volume groups, pools and other information. The schema information 206 may be sent over a http post request. A volume can include a name, capacity, etc. For example, the RabbitMQ/AMQP messages 204 include information as to volumes of products 104.

The schema information 206 is used to interpret the volumes in RabbitMQ/AMQP messages 204. Schema information 206 is sent to a schema manager 208. The schema manager 208 processes schema information 206 as schema metadata 210. The metadata 210 is related to the RabbitMQ/AMQP messages 204. The schema manager 208 can persist the schema metadata 210 to schema database 212. Communication can be through Structured Query Language (SQL) between schema manager 208 and schema database 212.

The RabbitMQ/AMQP messages 204 are received by a generic data streaming converter 214 which can be considered as a microservice. The RabbitMQ/AMQP messages 204 are relatively large (e.g., 128 MB) and are broken up by generic data streaming converter 214 into smaller messages. Sending smaller messages do not require continuous storage and be more memory efficient. Such smaller messages may be implemented as Kafka messages (i.e., encoded byte messages). Kafka being optimized to send smaller messages. The generic data streaming converter 214 acts as a Kafka message broker or microservice to serialize the smaller messages. Other implementations provide for message brokers such as Pravega, Pulsar, etc. The smaller messages are sent out as Kafka messages 216 (i.e., encoded byte messages). The encoded byte messages can also be sent as Pulsar or Pravega messages.

In-order messaging within generic data streaming converter 214 acting as a Kafka message broker can be achieved with unique message keys that ensure each batch of messages is sent in-order on the same message broker (e.g., Kafka) partition. A terminal sync message can be sent with a unique message key to identify end of an in-order streaming message group. When a sync message is received, database insertions can be performed, modifications and deletions enabled according to specifics of the message group and the terminal sync message.

The schema database 212 provides schema metadata in a particular format 218 to the generic data streaming converter 214 and a schema proto manager 220. Communication can be through SQL between schema database 212, generic data streaming converter 214, and schema proto manager 220.

Google Protocol Buffers or Google Protobuf is a cross platform format used to serialize structured data. Google Protobuf is useful in developing programs to communicate with each other over a network or for storing data. Kafka messages (e.g., Kafka messages 216) are serialized per the Google Protobuf format. Other formats can also include Avro Serialization Framework and Thrift Serialization Protocol.

Implementations provide for the schema proto manager 220 to receive schema metadata 218 from schema database 212 in the format as originally presented, and generate declarations 222 that allow serializing/deserializing of Kafka messages (e.g., Kafka messages 216). Implementations provide for declarations 222 to be master or multi-level message, formatted as Google Protobuf messages, as described above.

In particular, the generic data streaming converter 214 consults/receives declarations 222 from schema proto manager 220 to serialize Kafka messages 216.

Implementations provide for a reactive generic data stream processor 224 to receive Kafka messages 216, and receive declarations 222 that allow serializing/deserializing of Kafka messages (e.g., Kafka messages 216). The generic data stream processor 224 can be considered as a microservice to serialize/deserialize smaller messages (e.g., Kafka messages). The generic data stream processor 224 can include a reactive consumer message listener (not shown) which receives the Kafka messages 216, and creates separate reactive publishers (i.e., data streams) for each Kafka message 216 in order and partitioned as to Kafka message broker (generic data streaming converter 214). Furthermore, separate threads may be used to enable parallelism and prevent one in-order data flow from impacting the throughput of other parallel data flows.

Special coding precautions (e.g., use of concatMap rather than flatMap) are implemented to ensure that messages are consumed and processed in-order on each of the parallel data flows. Kafka message brokers can only guarantee in order message processing for data written to a specific Kafka topic with a specific Kafka key. Implementations provide that all messages that are written to a Kafka broker where order is preserved are written to a Kafka key that includes a product service 108 SystemID and a data objectType. The message order in the Kafka broker can also be preserved upon retries/failures with appropriate settings in the microservice (data processors and post processors 202) that sends the messages to the Kafka message broker (generic data streaming converter 214).

The reactive generic data stream processor 224 acts as a microservice that provides parallel data streams or reactive publishers uniquely grouped to each (message broker (e.g., Kafka) partition. In-order processing can be maintained on each parallel data stream or reactive publisher by using downstream (mapping) publishers that preserve strict order in each data stream.

The generic data stream processor 224 can communicate with a Cassandra database 226. The Cassandra database 226 is an open source NoSQL distributed database. Communication between the generic data stream processor 224 and Cassandra database 226 is through Cassandra Query Language (CQL).

The Cassandra database 226 includes all the data/information that has been received from products 104. A generic data application program interface (API) 228 receives product data/information 230 from the Cassandra database 226 sent through CQL. In certain implementations, the generic data API 228 is used by administrator system 112. The generic data API 228 allows queries of the products 104. Cassandra database 226 further provides data/information 232 to the generic data stream processor 224.

A data API/adapter 234 can keep a local cache of data similar to data in Cassandra database 226. The local cache of data is formatted for faster access to allow for use cases such as for graphical user interface (GUI) to perform sorting, paging, etc.

Implementations provide for a change event converter 236. As data/information as to products 104 change (e.g., new disk added to a product), the Cassandra database 226 receives the data/information (i.e., new/updated data/information). The generic data stream processor 224 receives Kafka messages 216 as to the updated data/information. The generic data stream processor 224 compares previously received Kafka messages 216 with the latest Kafka messages 216 as to products 104, and generates a Kafka message 238 as to change/update for a particular product. The change event converter 236 receives the Kafka message 238 and declarations 222 that allow serializing/deserializing of the Kafka message 238. The change event converter 236 is considered as microservice. The change event converter 236 converts Kafka message 238 to a RabbitMQ/AMQP message 240. The RabbitMQ/AMQP message 240 is provided to and consumed by the data API/adapter 234.

FIG. 3 shows a master or multilevel multi-level message 300 with generic data types for serialization and deserialization of encoded byte messages. Message 300 includes a top level message 302 with persistent information. Message 300 further includes sub-messages 304 which are a set of sub-messages with details that include property fields in which schema is dynamically loaded. One of the sub-messages 306 in this example is "MetricInfo" 306. Sub-messages 304 can further refer to or include other sub-messages that define type and reference undefine types.

FIG. 4 is a sub-message 400 with data types including defined and undefined types. The sub-message 400 can be referenced or embedded in sub-message 306. The sub-message 400 includes an "Any properties" field 402 which is not defined, where the type is dynamically loaded, the undefined input related to properties as to schema for serialization and deserialization of encode byte messages. Another sub-message may be referenced or embedded in the "Any properties" field 402.

FIG. 5 are messages 500 referenced or embedded by an undefined type, such as "Any properties" field 402. The messages 500 define schema for serialization and deserialization of encoded byte messages. Message one 502 is looked up with a particular key. Message 504 is looked up with a different key.

FIG. 6 is a key used to look up sub-messages. The key 600 defines particular parameters used to look up the sub-messages 500.

Figure 7:
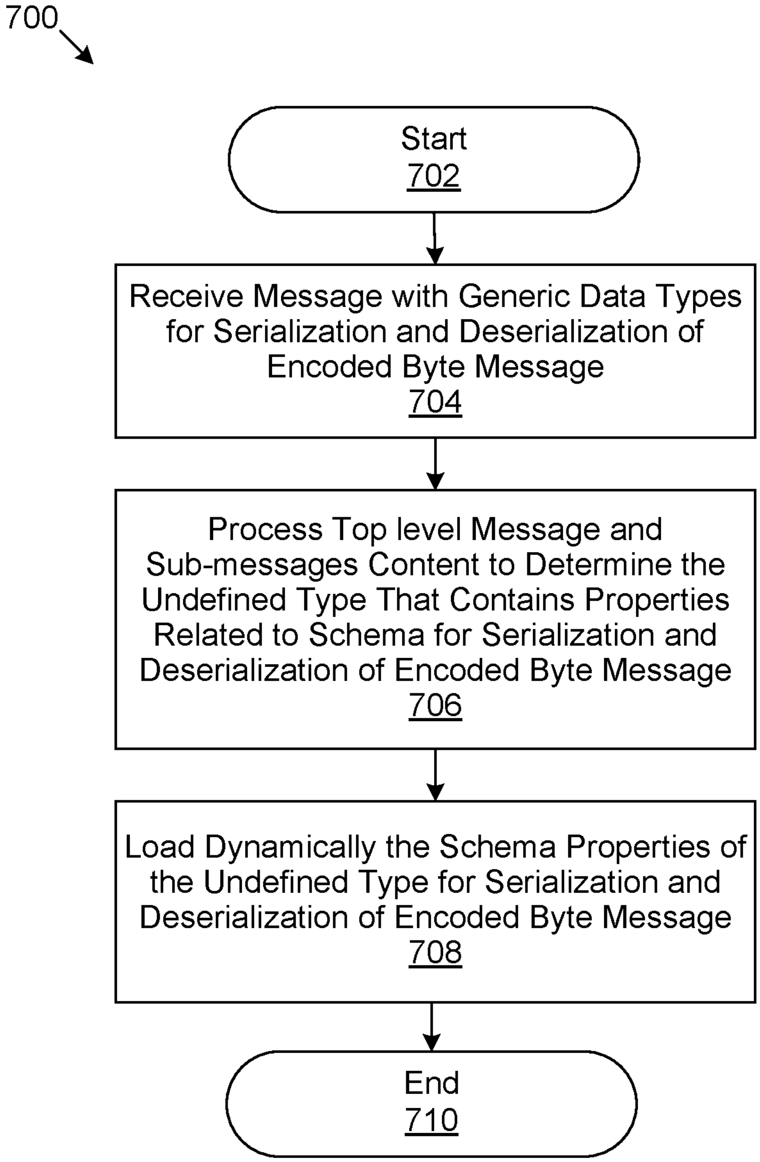
FIG. 7 is a generalized flowchart for encoded byte message serialization and deserialization by microservices.

FIG. 7 is a generalized flowchart 700 for encoded byte message serialization and deserialization by microservices. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 702 the process 700 starts. At step 704, a microservice (e.g., generic data streaming message converter 214, generic data streaming processor 224, and change event converter 236) receives a message with generic data types for serialization and deserialization the encoded byte message; wherein the message includes a top level message as to type that provides general information about the message content and applicability, and sub-messages as to types that includes content related to purpose which includes an undefined type that contains properties related to schema for serialization and deserialization of the encoded byte message.

At step 706, the top level message and sub-messages content are processed in order to determine the undefined type that contains properties related to schema for serialization and deserialization of the encoded byte message.

At step 708, the schema properties of the undefined type for serialization and deserialization of the encoded byte message are dynamically loaded for consumption by the microservices. At step 710, the process 700 ends.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 8:
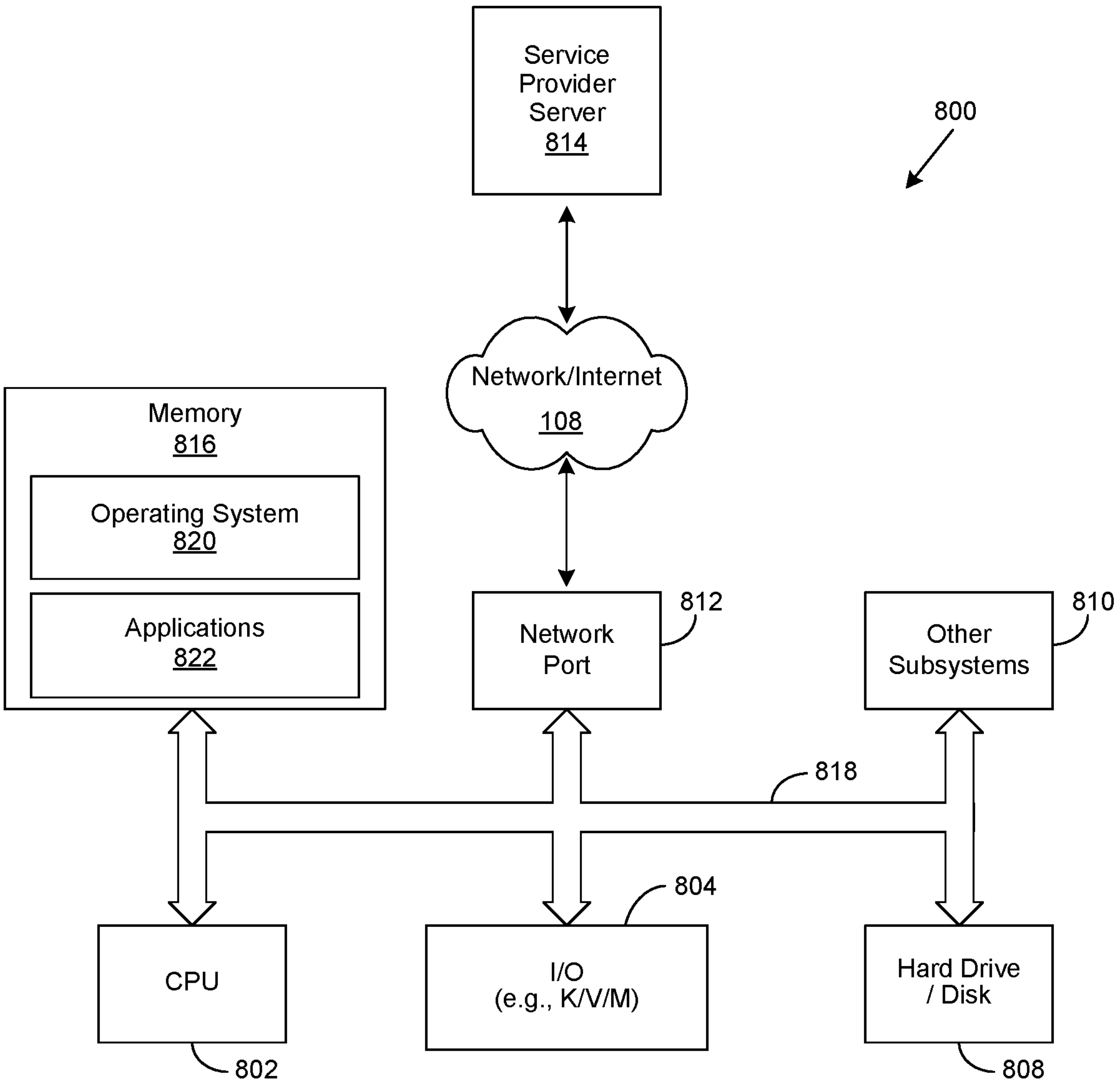
FIG. 8 is a general illustration of components of an information handling system as implemented in the present invention.

FIG. 8 is a generalized illustration of an information handling system 800 that can be used to implement the system and method of the present invention. The information handling system 800 can be implemented as a computing device, such as a network server, or multiple servers supporting a service/cloud service, such as product service 108. The information handling system 800 can also be computing devices of a cloud service that supports a service, such as product service 112.

The information handling system 800 includes a processor (e.g., central processor unit or "CPU") 802, input/output (I/O) devices 804, such as a microphone, a keyboard, a video/display, a mouse, and associated controllers (e.g., K/V/M).

The information handling system 800 includes a hard drive or disk storage 808, and various other subsystems 810. In various embodiments, the information handling system 800 also includes network port 812 operable to connect to the network 108 described herein, where network 108 can include one or more wired and wireless networks, including the Internet. Network 108 is likewise accessible by a service provider server 814.

The information handling system 800 likewise includes system memory 816, which is interconnected to the foregoing via one or more buses 818. System memory 816 can be implemented as hardware, firmware, software, or a combination of such. System memory 816 further includes an operating system (OS) 820. Embodiments provide for the system memory 816 to include applications 822. Applications 822 can be implemented as the components/microservices described herein.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Skilled practitioners of the art will recognize that many such embodiments are possible, and the foregoing is not intended to limit the spirit, scope or intent of the invention. Consequently, the invention is intended to be limited only by the spirit and scope of the appended claims, giving full cognizance to equivalents in all respects.

What is claimed is:

1. A computer-implementable method for encoded byte message serialization and deserialization by microservices comprising:

receiving a multi-level message with generic data types for serialization and deserialization the encoded byte message, wherein the multi-level message includes a top level message as to type that provides general information about content and applicability, and sub-messages as to types that include content related to purpose which includes an undefined type that contains properties related to schema for serialization and deserialization of the encoded byte message, wherein schema metadata is received to generate declarations to allow for serialization and deserialization of the messages wherein the declarations are used to serialize or deserialize the messages;

processing content of top level message and sub-messages to determine the undefined type that contains properties related to schema for serialization and deserialization of the encoded byte message, wherein the sub-messages are used for the encoded byte message transfer and include schema properties;

dynamically loading the schema properties of the sub-messages, of the undefined type for serialization and deserialization of the encoded byte message for consumption by the microservices; and processing small and large message files in order processing by the microservices. wherein large message groups are processed with coding precautions that preserve the order of messages in the large message groups, wherein every message in a group uses the same key coded systemId and objectType specific to a product service.

2. The method of claim 1, wherein the microservices are written in Python, Java, C#.NET, Golang, Scala, or C++.

3. The method of claim 2, wherein the microservices are one of Kafka, Pravega or Pulsar.

4. The method of claim 1, wherein the encoded byte messages are sent as Kafka, Pulsar or Pravega messages.

5. The method of claim 1, wherein the multi-level message is formatted as per one of Google Protocol Buffers, Avro Serialization Framework, Thrift Serialization Protocol.

6. The method of claim 1, wherein a sub-message references or embeds a message as to types that include content related to purpose which includes an undefined type that contains properties related to schema for serialization and deserialization of the encoded byte message.

7. The method of claim 1, wherein a key is used to look up the messages as to types that include content related to purpose which includes an undefined type that contains properties related to schema for serialization and deserialization of the encoded byte message.

8. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations for encoded byte message serialization and deserialization by microservices executable by the processor and configured for:

receiving a multi-level message with generic data types for serialization and deserialization the encoded byte message, wherein the multi-level message includes a top level message as to type that provides general information about content and applicability, and sub-messages as to types that include content related to purpose which includes an undefined type that contains properties related to schema for serialization and deserialization of the encoded byte message, wherein schema metadata is received to generate declarations to allow for serialization and deserialization of the messages wherein the declarations are used to serialize or deserialize the messages;

processing content of top level message and sub-messages to determine the undefined type that contains properties related to schema for serialization and deserialization of the encoded byte message, wherein the sub-messages are used for the encoded byte message transfer and include schema properties;

dynamically loading the schema properties of the sub-messages, of the undefined type for serialization and deserialization of the encoded byte message for consumption by the microservices; and processing small and large message files in order processing by the microservices, wherein large message groups are processed with coding precautions that preserve the order of messages in the large message groups, wherein every message in a group uses the same key coded systemId and objectType specific to a product service.

9. The system of claim 8, wherein the microservices are written in Python, Java, C#.NET, Golang, Scala, or C++.

10. The system of claim 8, wherein the microservices are one of Kafka, Pravega or Pulsar.

11. The system of claim 8, wherein the encoded byte messages are sent as Kafka, Pulsar or Pravega messages.

12. The system of claim 8, wherein the multi-level message is formatted as per one of Google Protocol Buffers, Avro Serialization Framework, Thrift Serialization Protocol.

13. The system of claim 8, wherein a sub-message references or embeds a message as to types that include content related to purpose which includes an undefined type that contains properties related to schema for serialization and deserialization of the encoded byte message.

14. The system of claim 8, wherein a key is used to look up the messages as to types that include content related to purpose which includes an undefined type that contains properties related to schema for serialization and deserialization of the encoded byte message.

15. A non-transitory, computer-readable storage medium embodying computer program code for message serialization and deserialization, the computer program code comprising computer executable instructions configured for encoded byte message serialization and deserialization by microservices comprising:

receiving a multi-level message with generic data types for serialization and deserialization the encoded byte message, wherein the multi-level message includes a top level message as to type that provides general information about content and applicability, and sub-messages as to types that include content related to purpose which includes an undefined type that contains properties related to schema for serialization and deserialization of the encoded byte message, wherein schema metadata is received to generate declarations to allow for serialization and deserialization of the messages wherein the declarations are used to serialize or deserialize the messages;

processing content of top level message and sub-messages to determine the undefined type that contains properties related to schema for serialization and deserialization of the encoded byte message, wherein the sub-messages are used for the encoded byte message transfer and include schema properties;

dynamically loading the schema properties of the sub-messages, of the undefined type for serialization and deserialization of the encoded byte message for consumption by the microservices; and processing small and large message files in order processing by the microservices. wherein large message groups are processed with coding precautions that preserve the order of messages in the large message groups, wherein every message in a group uses the same key coded systemId and objectType specific to a product service.

16. The non-transitory, computer-readable storage medium of claim 15, wherein the microservices are written in Python, Java, C#.NET, Golang, Scala, or C++.

17. The non-transitory, computer-readable storage medium of claim 15, wherein the message brokers are one of Kafka, Pravega or Pulsar.

18. The non-transitory, computer-readable storage medium of claim 15, wherein the multi-level message is formatted as per one of Google Protocol Buffers, Avro Serialization Framework, Thrift Serialization Protocol.

19. The non-transitory, computer-readable storage medium of claim 15, wherein a sub-message references or embeds a message as to types that include content related to purpose which includes an undefined type that contains properties related to schema for serialization and deserialization of the encoded byte message.

20. The non-transitory, computer-readable storage medium of claim 15, wherein a key is used to look up the messages as to types that include content related to purpose which includes an undefined type that contains properties related to schema for serialization and deserialization of the encoded byte message.

* * * * *